US011340340B2

(12) United States Patent
Kim et al.

(10) Patent No.: US 11,340,340 B2
(45) Date of Patent: May 24, 2022

(54) LIDAR APPARATUS AND OPERATING METHOD THEREOF

(71) Applicant: SAMSUNG ELECTRONICS CO., LTD., Suwon-si (KR)

(72) Inventors: Jungwoo Kim, Hwaseong-si (KR); Tatsuhiro Otsuka, Suwon-si (KR); Heesun Yoon, Incheon (KR); Inoh Hwang, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 558 days.

(21) Appl. No.: 16/023,681

(22) Filed: Jun. 29, 2018

(65) Prior Publication Data
US 2019/0079166 A1 Mar. 14, 2019

(30) Foreign Application Priority Data
Sep. 13, 2017 (KR) .................. 10-2017-0117227

(51) Int. Cl.
G01S 7/487 (2006.01)
G01S 7/493 (2006.01)
G01S 7/4865 (2020.01)
G01S 7/4915 (2020.01)
G01S 7/481 (2006.01)
G01S 7/4863 (2020.01)
G01S 17/08 (2006.01)
(Continued)

(52) U.S. Cl.
CPC ............ G01S 7/487 (2013.01); G01S 7/4816 (2013.01); G01S 7/4863 (2013.01); G01S 7/4865 (2013.01); G01S 7/493 (2013.01); G01S 7/4915 (2013.01); G01S 17/08 (2013.01); G01S 17/42 (2013.01); G01S 17/931 (2020.01)

(58) Field of Classification Search
CPC ...... G01S 7/487; G01S 7/4816; G01S 7/4863; G01S 7/4911–15; G01S 17/493; G01S 17/08; G01S 17/42; G01S 7/4914; G01S 7/4915; G01S 17/931; G01S 7/4865; G01S 7/493; G01S 17/89; G01S 17/894
See application file for complete search history.

(56) References Cited

U.S. PATENT DOCUMENTS 5,760,886 A 6/1998 Miyazaki et al.
6,301,003 B1 10/2001 Shirai et al.
6,731,236 B1 5/2004 Hager et al.
(Continued)

FOREIGN PATENT DOCUMENTS

EP 2708914 A1 3/2014
JP 4-158293 A 6/1992
(Continued)

OTHER PUBLICATIONS

Communication dated Jan. 30, 2019, issued by the European Patent Office in counterpart European Application No. 18186125.3.
(Continued)

Primary Examiner — Luke D Ratcliffe
(74) Attorney, Agent, or Firm — Sughrue Mion, PLLC

(57) ABSTRACT

Provided are a method of identifying light reflected from an object, from among light incident from a plurality of different directions, based on information about an irradiation angle of light irradiated by a light source, and a light detection and ranging (LiDAR) apparatus therefor.

13 Claims, 7 Drawing Sheets

(51) Int. Cl.
G01S 17/42 (2006.01)
G01S 17/931 (2020.01)

(56) References Cited

U.S. PATENT DOCUMENTS

| | | | |
|---|---|---|---|
| 9,952,323 B2* | 4/2018 | Deane | G01S 7/4817 |
| 2005/0213074 A1 | 9/2005 | Hoashi | |
| 2005/0265998 A1 | 12/2005 | Elson | |
| 2015/0103331 A1 | 4/2015 | Oh et al. | |
| 2015/0145764 A1* | 5/2015 | Hiromi | G01S 17/36 |
| | | | 345/156 |
| 2016/0259038 A1 | 9/2016 | Retterath et al. | |
| 2017/0139041 A1* | 5/2017 | Drader | G01S 7/4865 |
| 2017/0168162 A1* | 6/2017 | Jungwirth | G01S 7/4816 |
| 2018/0045816 A1* | 2/2018 | Jarosinski | G01S 17/06 |

FOREIGN PATENT DOCUMENTS

| | | |
|---|---|---|
| JP | 7-98381 A | 4/1995 |
| JP | 2000-56018 A | 2/2000 |
| JP | 2005-274413 A | 10/2005 |
| JP | 2008-506115 A | 2/2008 |
| JP | 2014-5301 A | 1/2014 |
| JP | 2014-106191 A | 6/2014 |
| JP | 2015-78953 A | 4/2015 |
| WO | 2006/014470 A2 | 2/2006 |

OTHER PUBLICATIONS

Jie Hao et al., "Ultra-low power anti-crosstalk collision avoidance light detection and ranging using chaotic pulse position modulation approach", Chinese Physics B., vol. 25, No. 7, 2016; pp. 074207-1-074207-8 (9 pages total).

Communication dated Feb. 22, 2022 by the Korean Intellectual Property Office in Korean Patent Application No. 10-2017-0117227.

Communication dated Mar. 1, 2022 by the Japanese Patent Office in Japanese Patent Application No. 2018-158265.

* cited by examiner

LIDAR APPARATUS AND OPERATING METHOD THEREOF

CROSS-REFERENCE TO RELATED APPLICATION

This application claims priority from Korean Patent Application No. 10-2017-0117227, filed on Sep. 13, 2017, in the Korean Intellectual Property Office, the disclosure of which is incorporated herein in its entirety by reference.

BACKGROUND

1. Field

Apparatuses and methods consistent with exemplary embodiments relate to a light detection and ranging (LiDAR) apparatus and an operating method thereof.

2. Description of the Related Art

A light time-of-flight (TOF) measuring method is one of a number of methods used for measuring a distance to an object by using a three-dimensional (3D) camera or light detection and ranging (LiDAR). The TOF measuring method basically involves a process of projecting light having a specific waveform onto an object, measuring or imaging light having the same wavelength reflected from the object by using a photodiode (PD) or a camera, and extracting a depth image.

SUMMARY

One or more exemplary embodiments provide light detection and ranging (LiDAR) apparatuses and operating methods thereof.

Additional exemplary aspects and advantages will be set forth in part in the description which follows and, in part, will be apparent from the description, or may be learned by practice of the presented exemplary embodiments.

According to an aspect of an exemplary embodiment, a LiDAR apparatus includes: a light source configured to irradiate light onto an object; a light detector configured to detect light incident from a plurality of different directions; a light identifier configured to identify light reflected from the object from among the light incident from the plurality of different directions, based on information about an irradiation angle of the irradiated light; and a processor configured to determine a distance to the object by using the identified light.

The light detector may include a plurality of light detection elements configured to individually detect the light incident from the plurality of different directions, and the light identifier may be further configured to identify a light detection element corresponding to the irradiation angle of the irradiated light from among the plurality of light detection elements, and to identify light detected by the determined light detection element as the light reflected from the object.

An irradiation angle at which the light source irradiates the light may be preset to correspond to one of the plurality of light detection elements.

Each of the plurality of light detection elements may include at least one of an avalanche photodiode (APD) and a single photon avalanche diode (SPAD).

The light identifier may include: a plurality of time counters configured to measure a time of flight (TOF) of the light incident from each of the plurality of different directions; and a selector configured to select a TOF of the light reflected from the object from among the TOF of the light incident from each of the plurality of different directions, based on the information about the irradiation angle of the irradiated light, and the processor may be further configured to determine the distance to the object based on the TOF of the light reflected from the object.

Each of the plurality of time counters may be a time-to-digital converter (TDC), and the selector may be a multiplexer.

The light identifier may include: a plurality of analog-to-digital converters (ADCs) configured to measure a time of flight (TOF) and an intensity of the light incident from each of the plurality of different directions; and a selector configured to select a TOF and intensity of the light reflected from the object from among the TOF and intensity of the light incident from each of the plurality of different directions, based on the information about the irradiation angle of the irradiated light, and the processor may be further configured to perform data processing for acquiring information about the object based on the TOF and intensity of the light reflected from the object.

The light detector may include: a lens configured to collect the light incident from each of the plurality of different directions; a plurality of light detection elements, each configured to individually detect light incident from one of the plurality of different directions and to output a current signal; a plurality of current-to-voltage conversion circuits, each configured to convert a current signal, output from one of the plurality of light detection elements, into a voltage signal; a plurality of amplifiers, each configured to amplify a voltage signal, output from one of the plurality of current-to-voltage conversion circuits; and a plurality of peak detectors, each configured to detect a peak from the voltage signal amplified by one of the plurality of current-to-voltage conversion circuits.

According to an aspect of another exemplary embodiment, a method of operating a LiDAR apparatus includes: irradiating light onto an object; detecting light incident from a plurality of different directions; identifying light reflected from the object from among the light incident from the plurality of different directions, based on information about an irradiation angle of the irradiated light; and determining a distance to the object by using the identified light.

According to an aspect of another exemplary embodiment, there is provided a non-transitory computer-readable recording medium having recorded thereon a program for performing a method of operating a LiDAR apparatus on a computer.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
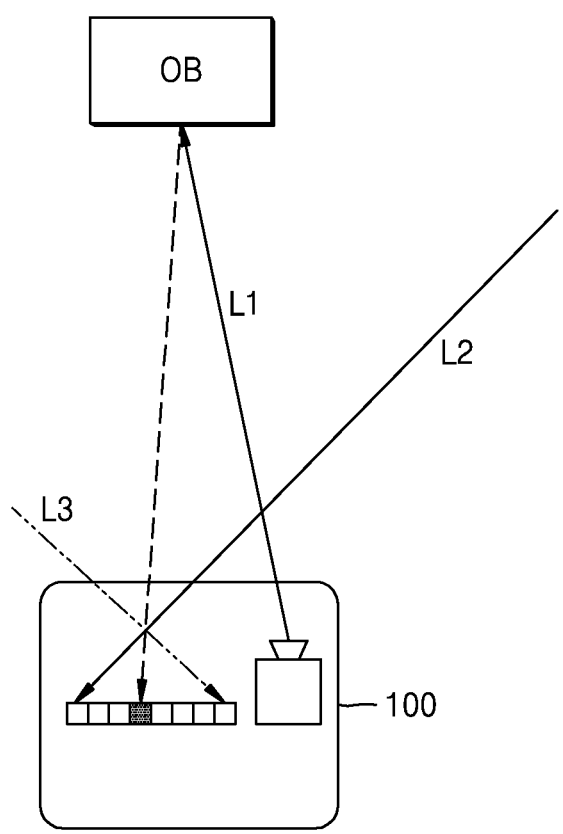
FIG. 1 is a diagram illustrating an operation of a light detection and ranging (LiDAR) apparatus according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of the present disclosure will be described in detail with reference to the accompanying drawings. The descriptions of the following embodiments should not be construed as limiting the scope of the present disclosure, and matters that may be easily inferred by those or ordinary skill in the art will be construed as falling within the scope of the present disclosure.

It will be understood that terms such as "comprise", "include", and "have", when used herein, specify the presence of stated elements, but do not preclude the presence or addition of one or more other elements. Also, the terms "unit" and "module" as used herein represent a unit for processing at least one function or operation, which may be implemented by hardware, software, or a combination thereof.

It will be understood that, although the terms "first", "second", etc. may be used herein to describe various elements. These terms are only used to distinguish one element from another.

FIG. 1 is a diagram illustrating an operation of a light detection and ranging (LiDAR) apparatus according to an exemplary embodiment.

The LiDAR apparatus 100 may be used as a sensor configured to acquire three-dimensional (3D) information, such as distance information about an object, disposed forward of the apparatus, in real time. For example, the LiDAR apparatus 100 may be applied to an unmanned vehicle, an autonomous vehicle, a robot, or a drone.

The LiDAR apparatus 100 may irradiate light L1 toward an object OB. The irradiated light L1 may be reflected from the object OB, and the LiDAR apparatus 100 may detect the light L1 reflected from the object OB. Also, the LiDAR apparatus 100 may detect light L2 and L3, incident from the environment, as well as the light L1 reflected from the object OB. In other words, the LiDAR apparatus 100 may detect the light L1, L2, and L3 incident from different directions. For example, the light L2 and L3 incident from the environment may be light incident from a different, external, LiDAR apparatus. Also, the LiDAR apparatus 100 may detect the unintended light L2 and L3 as well as the light L1 reflected from the object OB subjected to distance measurement. That is, a crosstalk phenomenon may occur.

The LiDAR apparatus 100 may identify the light L1, reflected from the object OB, from among the detected light L1, L2, and L3, based on information about the irradiation angle of the light L1. Specifically, the LiDAR apparatus 100 may include a plurality of light detection elements configured to individually detect the light L1, L2, and L3 incident from different directions. The LiDAR apparatus 100 may select a light detection element corresponding to the irradiation angle of the light L1 from among the light detection elements, and identify the light detected by the selected light detection element as the light L1 reflected from the object OB. The LiDAR apparatus 100 may calculate a distance to the object OB by using the identified light L1.

In this way, the LiDAR apparatus 100 may identify the light reflected from the object OB from among the detected light, thus preventing the occurrence of crosstalk.

Figure 2:
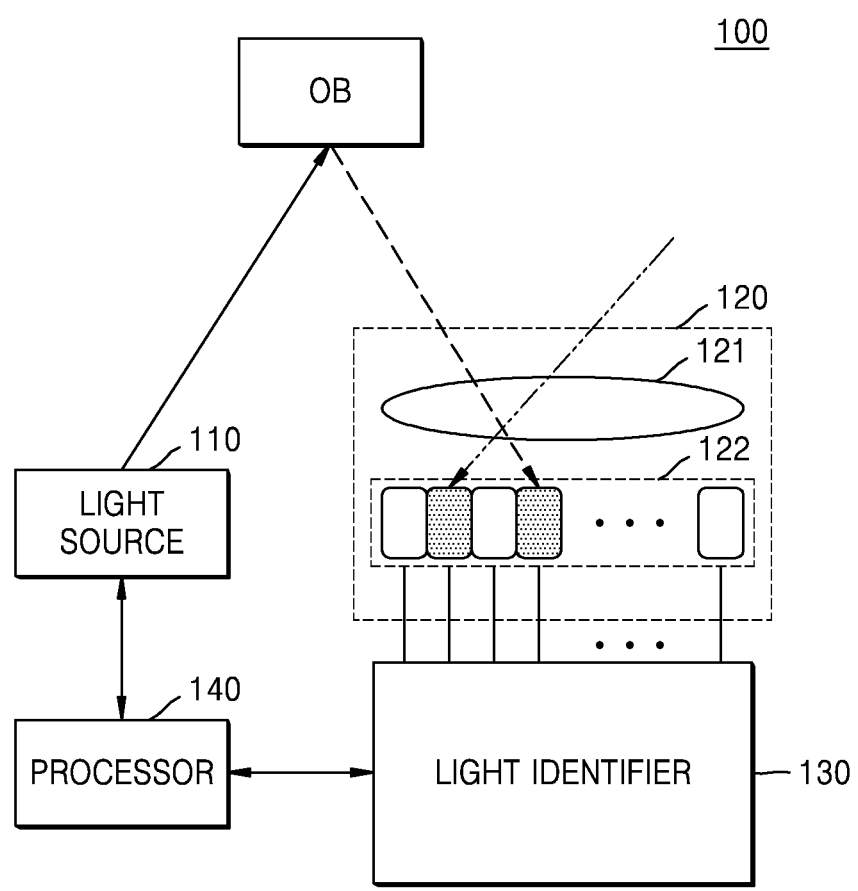
FIG. 2 is a diagram of a LiDAR apparatus according an exemplary embodiment.

FIG. 2 is a diagram of the LiDAR apparatus 100 according an exemplary embodiment.

The LiDAR apparatus 100 may include a light source 110, a light detector 120, a light identifier 130, and a processor 140. Only elements associated with the LiDAR apparatus 100 according to this exemplary embodiment are illustrated in FIG. 2. Therefore, it will be understood by those of ordinary skill in the art that the LiDAR apparatus 100 may further include other general-purpose elements in addition to the elements specifically illustrated in FIG. 2.

The light source 110 may irradiate light L1 toward an object OB. For example, the light source 110 may emit light in an infrared wavelength band. The use of the infrared light may prevent the mixing of the irradiated light with natural light in a visible wavelength band, such as sunlight. However, the light source 110 is not necessarily limited to infrared light, and the light source 110 may emit light in any of various wavelength bands. In this case, correction may be required to remove information of the mixed natural light. For example, the light source 110 may be a laser light source, and is not limited to a specific example. The light source 110 may be any one of an edge emitting laser, a vertical-cavity surface emitting laser (VCSEL), and a distributed feedback laser. For example, the light source 110 may be a laser diode. According to exemplary embodiments, the light source 110 may be included in another apparatus, and need not be necessarily configured by hardware included in the LiDAR apparatus 100.

The light source 110 may irradiate light to be used to analyze the position and shape of the object OB. The light source 110 may include a light source, such as a laser diode (LD), a light emitting diode (LED), or a super luminescent diode (SLD), which is configured to generate and irradiate light in a predetermined wavelength band suitable for analysis of the position and shape of an object, for example, light in an infrared wavelength band. The light source 110 may be configured to generate and irradiate light in a plurality of different wavelength bands. The light source 110 may be configured to generate and irradiate pulsed light or continuous light. The light source 110 may irradiate light toward the object OB under the control of the processor 140. Specifically, the processor 140 may set an irradiation direction of light or an irradiation angle of light, and may control the light source 110 to irradiate light according to the set irradiation angle or direction.

The light detector 120 may include a lens 121 and a plurality of light detection elements 122. The lens 121 may collect light incident thereon from different directions. For example, the lens 121 may be a convex lens.

The light detection elements 122 may individually detect the light collected by the lens 121. Specifically, the light incident from different directions may be collected by the lens 121 at different positions, and the light detection elements 122 may individually detect the light collected at the different positions. The light detection elements 122 may be arranged in a direction parallel to a longitudinal direction of the lens 121, and may be arranged in a two-dimensional (2D) array in the form of a 1×n or and n×n array (where n is a natural number).

Each of the light detection elements 122 may be a light-receiving element. The light detection element may be a light-receiving element configured to operate in a state in which a bias voltage is applied thereto. For example, the light detection element may include an avalanche photo-diode (APD) or a single photon avalanche diode (SPAD). The light detector 120 may have different specific circuit configurations, such as an analog front end (AFE) or a time to digital converter (TDC), according to which one of the APD and the SPAD is included. Detailed descriptions of specific circuit configurations are omitted herefrom, and one of skill in the art would understand that any of a number of conventional techniques may be used.

The light identifier 130 may identify light reflected from the object OB from among the light detected by the light detection elements 122, based on information about the irradiation angle or irradiation angle of the light irradiated by the light source 110.

The direction of light reflected or scattered from the object may vary according to the irradiation angle of the light irradiated by the light source 110. As a result, the light detection element detecting the light reflected or scattered from the object from among the light detection elements 122 may also vary. Therefore, the different irradiation angles of the light irradiated by the light source 110 may be preset and may correspond, respectively, to the plurality of light detection elements 122, and the light identifier 130 may identify light reflected from the object OB based on information about the correspondence between the irradiation angle of the light and the light detection elements 122.

The light identifier 130 may acquire information about the irradiation angle or irradiation direction of the light from the processor 140. The light identifier 130 may determine the light detection element corresponding to the irradiation angle of the light irradiated by the light source 110 from among the light detection elements 122. Since an irradiation angle value of the light corresponding to each of the light detection elements 122 can be preset, the light identifier 130 may determine the light detection element corresponding to the irradiation angle value of the light irradiated by the light source 110. For example, when the light source 110 irradiates light at an irradiation angle of 30 degrees clockwise from a reference direction, the light identifier 130 may determine that the light detection element corresponding to the irradiation angle of 30 degrees is the fourth light detection element on the left from among the light detection elements 122 arranged in the form of a 1×n array. Then, the light identifier 130 may identify the light detected by the determined light detection element as the light reflected from the object OB.

The processor 140 may control the operations of the respective elements of the LiDAR apparatus 100. Also, the LiDAR apparatus 100 may include a memory configured to store one or more programs and data necessary for the operation of the processor 140.

The processor 140 may determine a distance to the object OB by using the light reflected from the identified object OB. In other words, the processor 140 may determine a distance from the LiDAR apparatus 100 to the object OB by using the light reflected from the object OB. The processor 140 may determine the distance to the object OB by measuring a time of flight (TOF) of the light reflected from the object OB. Specifically, the processor 140 may determine the distance to the object OB by measuring the time between a time point at which the light source 110 irradiates the light and a time point at which the light reflected from the object is detected. Since the technique for determining the distance to the object by using the measured TOF of the light is a conventional technique, a detailed description thereof will be omitted.

Figure 3:
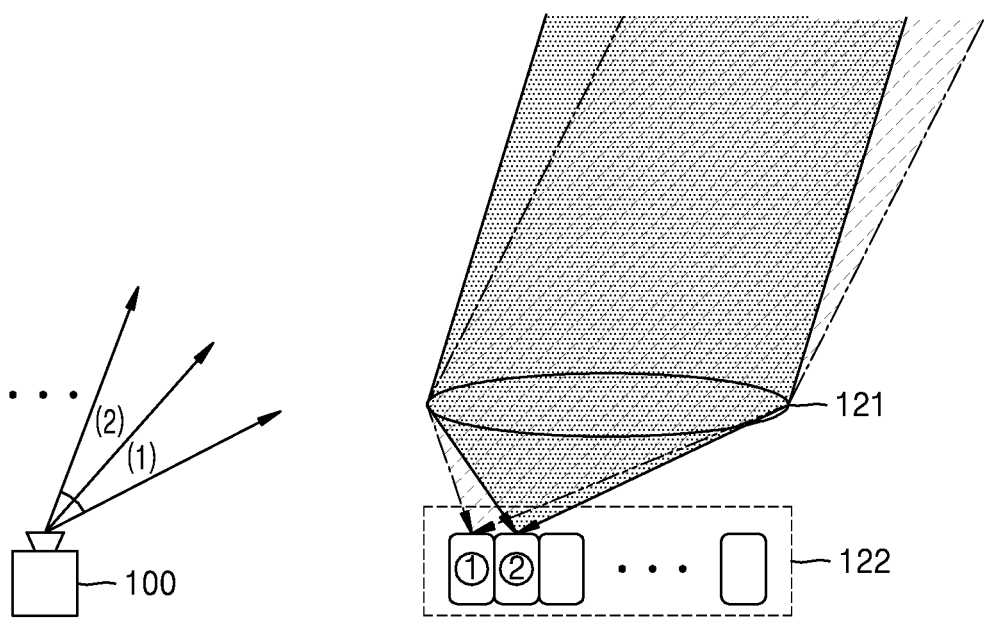
FIG. 3 is a diagram illustrating a correspondence between irradiation angles of light and a plurality of detection elements, according to an exemplary embodiment.

FIG. 3 is a diagram illustrating a correspondence between irradiation angles of light and a plurality of detection elements, according to an exemplary embodiment.

Irradiation angles of light irradiated by the light source 110 may be respectively set to correspond to the light detection elements 122. Referring to FIG. 3, when the light source 110 irradiates light in an angle range (1), a light detection element ①, from among the light detection elements 122, may detect the light reflected from the object. Similarly, when the light source 110 irradiates light in an angle range (2), a light detection element ②, from among the light detection elements 122, may detect the light reflected from the object. Accordingly, the irradiation angle range of the light corresponding to the light detection element ① from among the light detection elements 122 may be set to (1), and the irradiation angle range of the light corresponding to the light detection element ② from among the light detection elements 122 may be set to (2).

Thus, the light identifier 130 may identify the light detection element detecting the irradiated light reflected from the object from among the light detection elements 122 by using the irradiation angle of the light irradiated by the light source 110.

Figure 4:
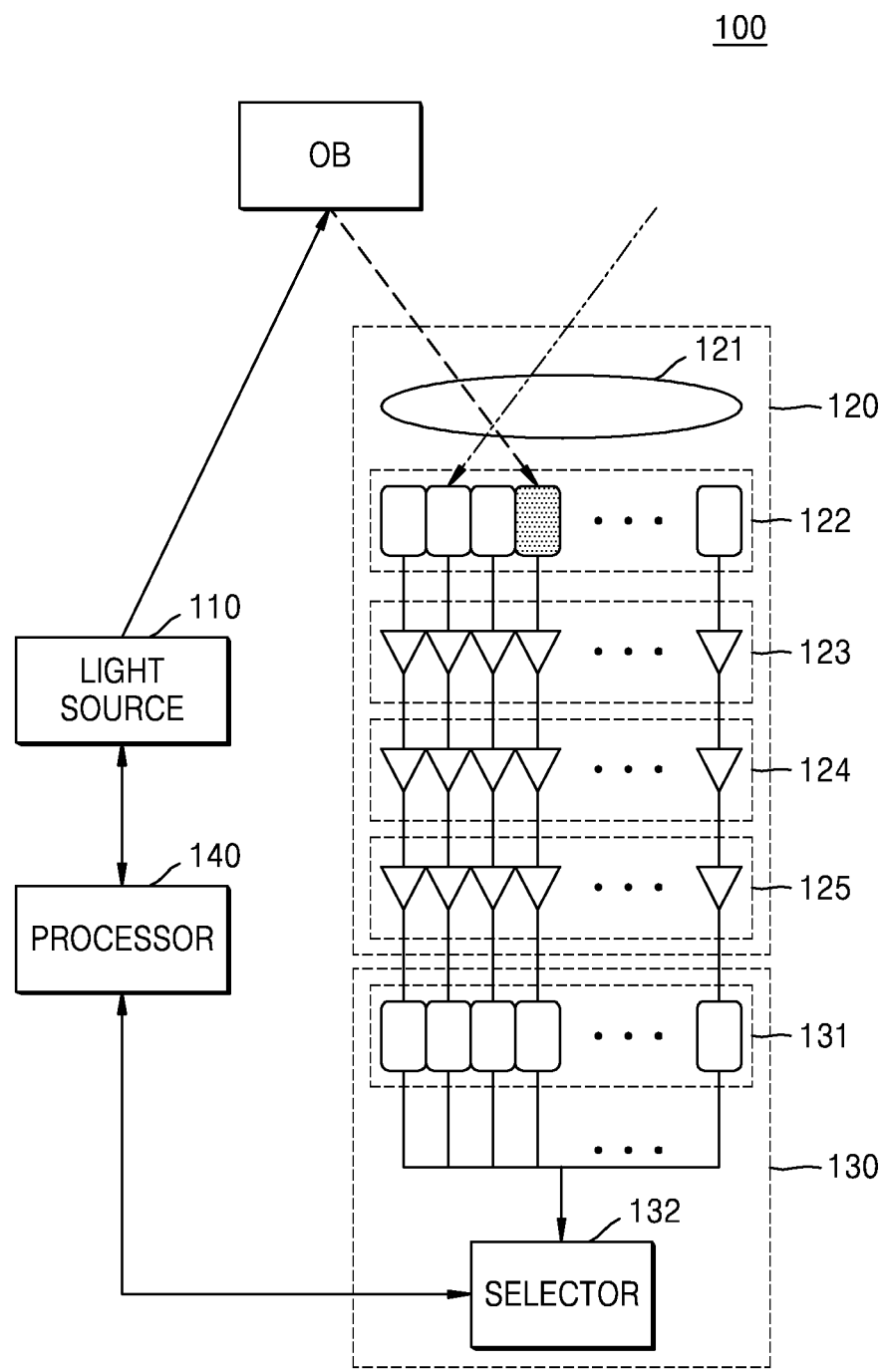
FIG. 4 is a diagram of a light detector and a light identifier, according to an exemplary embodiment.

FIG. 4 is a diagram of the light detector 120 and the light identifier 130, according to an exemplary embodiment.

The light detector 120 may include a lens 121, a plurality of light detection elements 122, a plurality of current-to-voltage conversion circuits 123, a plurality of amplifiers 124, and a plurality of peak detectors 125.

The lens 121 may collect light incident from a plurality of different directions.

The light detection elements 122 may individually detect the light collected by the lens 121 and thereby output current signals.

The current-to-voltage conversion circuits 123 may convert the current signals output from the light detection elements 122 into voltage signals.

The amplifiers 124 may amplify the voltage signals output from the current-to-voltage conversion circuits 123.

The peak detectors 125 may detect peaks from the voltage signals amplified by the amplifiers 124. According to an exemplary embodiment, the peak detectors 125 may detect peaks by detecting the rising edges and falling edges of electrical signals. Alternately, the peak detectors 125 may detect peaks by using a constant fraction discriminator (CFD) method. The peak detectors 125 may further include comparators and may output the detected peaks in the form of pulse signals.

The light identifier 130 may include a plurality of time counters 131 and a selector 132.

The time counters 131 may measure a TOF of light detected by each of the light detection elements 122. Specifically, when the pulse signal output from each of the peak detectors 125 is input, each of the time counters 131 may measure a TOF of light by calculating the number of cycles of a clock signal generated from the time point at which the light is irradiated by the light source 110. Also, each of the time counters 131 may store information about each of the measured TOFs of light in a register. According to an exemplary embodiment, each of the time counters 131 may be implemented by a time-to-digital converter (TDC).

The selector 132 may select the TOF of the light irradiated by the light source 110 and reflected from the object from among a plurality of TOFs measured by the time counters 131, based on the information about the irradiation angle of the light irradiated by the light source 110. Specifically, as described above, just as the angle at which the light source 110 irradiates light is set in correspondence with each of the light detection elements 122, the angle at which the light source 110 irradiates light may also be set in correspondence with each of the time counters 131. Therefore, the selector 132 may select the time counter corresponding to the irradiation angle value of the irradiated light from among the time counters 131, and select the TOF of the light measured by the selected time counter as the TOF of the light reflected from the object. For example, the selector 132 may be implemented by a logic circuit such as a multiplexer (MUX).

The processor 140 may determine a distance to the object by using the TOF of the light selected by the selector 132.

Figure 5:
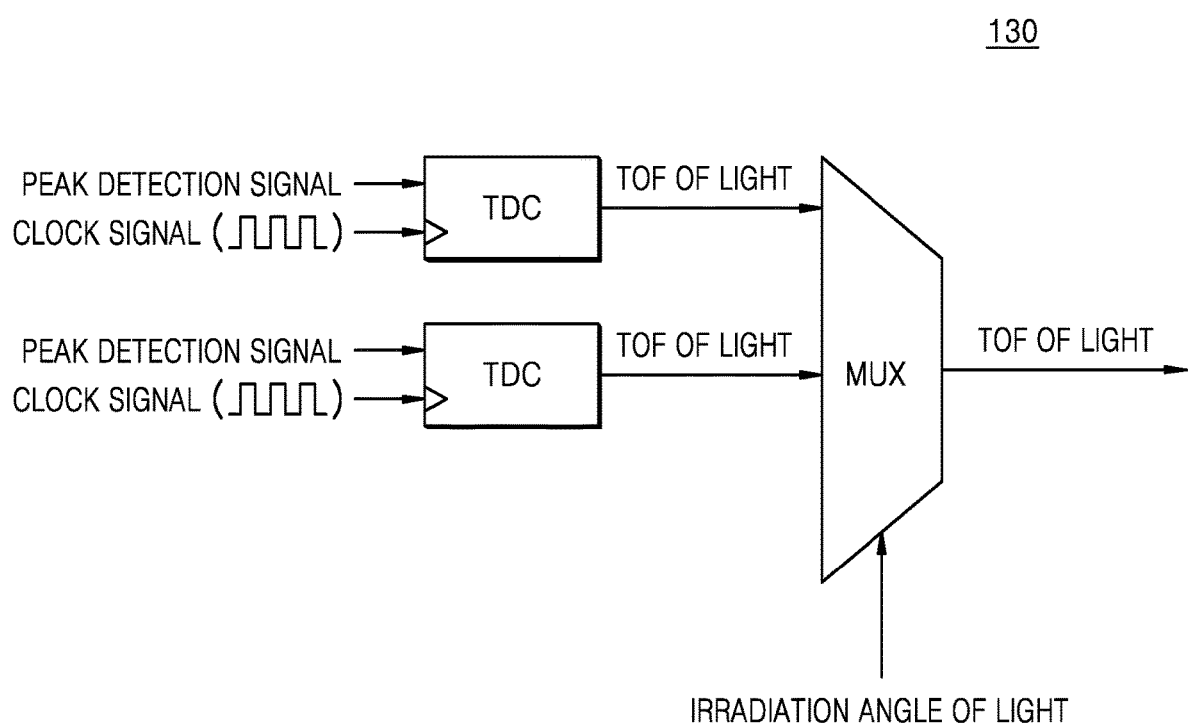
FIG. 5 is a diagram of a light identifier according to a specific embodiment.

FIG. 5 is a diagram of the light identifier 130 according to an exemplary embodiment.

The light identifier 130 may include a plurality of TDCs and a MUX.

The TDCs may measure TOFs of light detected by the light detection elements 122. Specifically, each of the TDCs may receive a peak detection signal output from a corresponding one of the peak detectors 125, and may calculate the number of cycles of a clock signal generated from the time point at which the light is irradiated by the light source 110. In other words, each of the TDCs may measure a TOF of light detected by a corresponding one of the light detection elements 122 by calculating the number of cycles of the clock signal generated from the time point at which the light is irradiated by the light source 110 to the time point at which the peak detection signal is received.

The MUX may receive the TOFs of the light from the TDCs. Also, the MUX may receive, from the processor 140, information about the irradiation angle of the light irradiated by the light source 110. The MUX may select one of the TOFs of the detected light based on the information about the irradiation angle of the light irradiated by the light source 110. Specifically, since the irradiation angles respectively corresponding to the TDCs can be preset, the MUX may select the TOF of the light corresponding to the input irradiation angle of the light from among the TOFs of the light.

The TDCs may each store the measured TOFs of the light in registers, and the MUX may select the TOF of the light corresponding to the input irradiation angle of the light from among the TOFs of the light stored in the registers for every set period. For example, each two microseconds, the MUX may select the TOF of the light corresponding to the input irradiation angle of the light.

The MUX may transmit information about the preselected TOF of light to the processor 140. The processor 140 may determine a distance to the object by using the selected TOF of the light.

Figure 6:
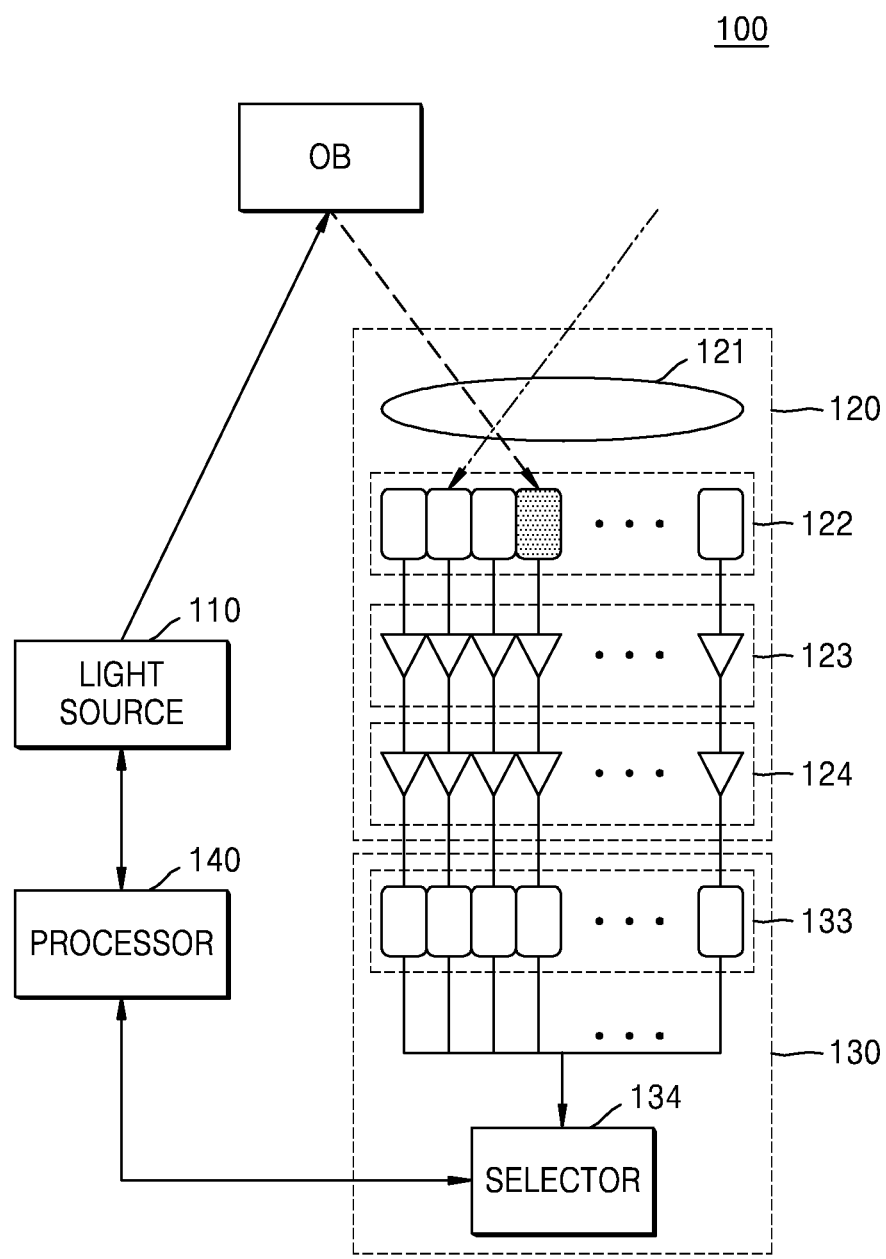
FIG. 6 is a diagram of a light detector and a light identifier, according to another exemplary embodiment.

FIG. 6 is a diagram of the light detector 120 and the light identifier 130, according to another exemplary embodiment.

According to an exemplary embodiment, the light detector 120 may include a lens 121, a plurality of light detection elements 122, a plurality of current-to-voltage conversion circuits 123, and a plurality of amplifiers 124.

Since the lens 121, the light detection elements 122, the current-to-voltage conversion circuits 123, and the amplifiers 124 are substantially the same as those described with reference to FIG. 4, a redundant description thereof will be omitted.

According to an exemplary embodiment, the light identifier 130 may include a plurality of analog-to-digital converters (ADCs) 133 and a selector 134.

The ADCs 133 may measure TOFs and intensities of light detected by the light detection elements 122. Specifically, the ADCs 133 may measure the intensities of the light detected by the light detection elements 122 by measuring amplitudes of electrical signals output from the amplifiers 124. Also, when the electrical signals output from the amplifiers 124 are input, the ADCs 133 may measure a TOF of light by calculating the number of cycles of a clock signal generated from the time point at which the light is irradiated by the light source 110.

The selector 134 may select the TOF and the intensity of the light irradiated by the light source 110 and reflected from the object from among a plurality of TOFs and intensities of light measured by the ADCs 133, based on the information about the irradiation angle of the light irradiated by the light source 110.

The processor 140 may perform data processing for acquiring information about the object by using the TOF and the intensity of the light selected by the selector 134.

Figure 7:
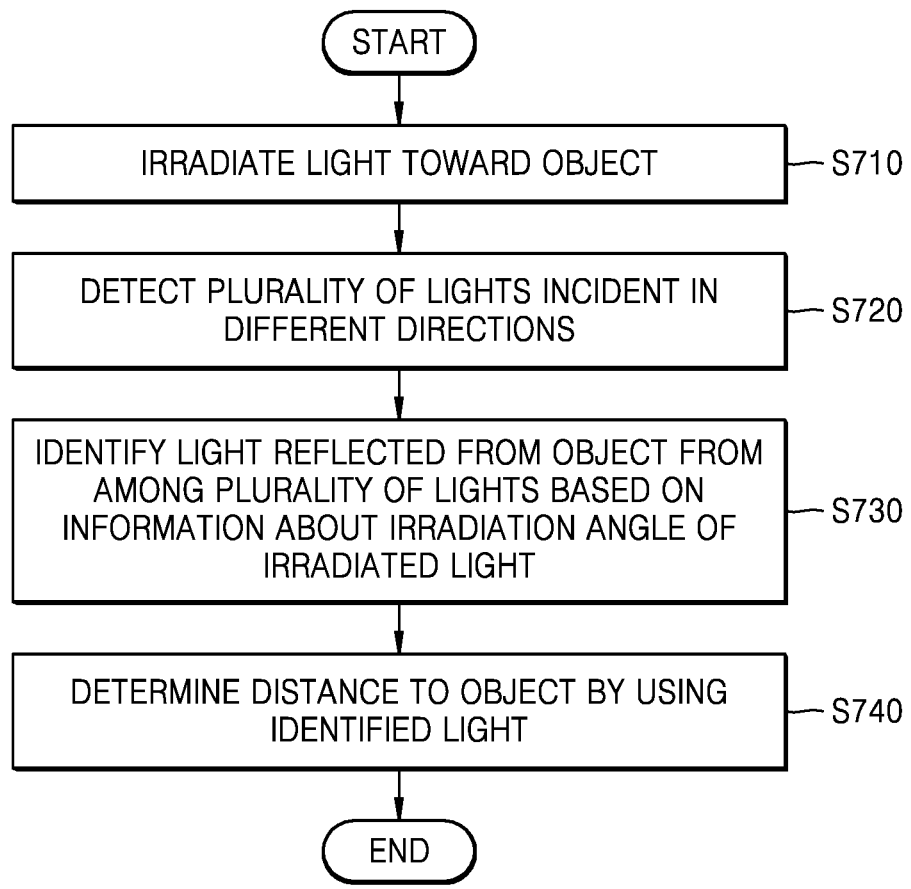
FIG. 7 is a diagram for describing a method of operating a Lidar apparatus, according to an exemplary embodiment.

FIG. 7 is a flowchart of a method of operating a LiDAR apparatus, according to an exemplary embodiment.

The method of FIG. 7 may be performed by the respective elements of the LiDAR apparatuses 100 of FIGS. 1 to 6, and a redundant description thereof will be omitted.

In operation S710, the LiDAR apparatus 100 may irradiate light toward an object. The LiDAR apparatus 100 may irradiate light to be used to analyze the position and shape of the object by using a light source. The LiDAR apparatus 100 may generate and irradiate light in different wavelength bands, and may generate and irradiate pulsed light or continuous light.

The LiDAR apparatus 100 may set an irradiation direction or irradiation angle of light, and may irradiate light according to the set irradiation angle or irradiation direction.

In operation S720, the LiDAR apparatus 100 may detect light lights incident from a plurality of different directions. Specifically, the LiDAR apparatus 100 may collect the light incident from the plurality of different directions by using a lens, and may individually detect the collected light by using the light detection elements.

The LiDAR apparatus 100 may convert a current signal output from each of the light detection elements into a voltage signal by using the current-to-voltage conversion circuits. Also, the LiDAR apparatus 100 may amplify the voltage signals output from the current-to-voltage conversion circuits 123 by using the amplifiers. Also, the LiDAR apparatus 100 may detect peaks from the voltage signals amplified by the amplifiers 124.

In operation S730, the LiDAR apparatus 100 may identify light reflected from the object from among the light detected in operation S720, based on information about the irradiation angle of the light irradiated in operation S710. Each of a plurality of irradiation angles of the light irradiated by the light source may be preset to correspond to one of the light detection elements, and the LiDAR apparatus 100 may identify light reflected from the object based on information about the correspondence between the irradiation angle of the light and the light detection elements.

The LiDAR apparatus 100 may select the light detection element corresponding to the irradiation angle of the light irradiated by the light source from among the light detection elements. Since the irradiation angle value of the light corresponding to each of the light detection elements can be preset, the LiDAR apparatus 100 may determine the light detection element corresponding to the irradiation angle value of the light irradiated by the light source. Then, the LiDAR apparatus 100 may identify the light detected by the determined light detection element as the light reflected from the object.

The LiDAR apparatus 100 may measure a TOF of light detected by each of the light detection elements by using the time counters. Specifically, when the pulse signal output from each of the peak detectors is input, the LiDAR apparatus 100 may measure a TOF of light by using the time counters by calculating the number of cycles of a clock signal generated from the time point at which the light is irradiated by the light source.

The LiDAR apparatus 100 may use the selector to select the TOF of the light irradiated by the light source and reflected from the object from among a plurality of TOFs measured by the time counters, based on the information about the irradiation angle of the light irradiated by the light source. Specifically, the LiDAR apparatus 100 may determine the time counter corresponding to the irradiation angle value of the irradiated light from among the time counters, and select the TOF of the light measured by the determined time counter as the TOF of the light reflected from the object.

According to another exemplary embodiment, the LiDAR apparatus 100 may measure a TOF and intensity of light detected by each of the light detection elements by using the ADCs. Specifically, the LiDAR apparatus 100 may use the ADCs to measure the intensities of the light detected by the light detection elements by measuring amplitudes of electrical signals output from the amplifiers. Also, when electrical signals output from the amplifiers are input, the LiDAR apparatus 100 may measure a TOF of light by using the ADCs by calculating the number of cycles of a clock signal generated from the time point at which the light is irradiated by the light source.

The LiDAR apparatus 100 may select the TOF and the intensity of the light irradiated by the light source and reflected from the object from among a plurality of TOFs and intensities of light measured by the ADCs, based on the information about the irradiation angle of the light irradiated by the light source.

In operation S740, the LiDAR apparatus 100 may determine a distance to the object by using the light identified in operation S730. In other words, the LiDAR apparatus 100 may determine a distance to the object by using the light reflected from the object.

Also, the LiDAR apparatus 100 may perform data processing for acquiring information about the object by using the TOF and the intensity of the light selected by the selector.

According to exemplary embodiments of the present disclosure, the LiDAR apparatus is capable of identifying the light reflected from the object subjected to distance measurement from among the lights detected by the light detection elements, thus preventing the occurrence of crosstalk.

The apparatus described herein may include a processor, a memory configured to store and execute program data, a permanent storage such as a disk drive, a communication port configured to handle communications with external devices, and user interface devices, including a touch panel, keys, buttons, and the like. The methods implemented by software modules or algorithms may be stored as program instructions or computer-readable codes executable on the processor or a non-transitory computer-readable medium. Examples of the non-transitory computer-readable medium may include magnetic storage media (for example, read-only memory (ROM), random-access memory (RAM), a floppy disk, a hard disk, etc.), and optical readable media (for example, CD-ROM, digital versatile disc (DVD), and the like). The non-transitory computer-readable recording medium may also be distributed over network-coupled computer systems so that the non-transitory computer-readable code is stored and executed in a distributed fashion. This media may be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit components, for example, memory elements, processing elements, logic elements, look-up tables, and the like, which may carry out a variety of functions under the control of one or more microprocessors or other control devices. Similarly, where the elements of the present disclosure are implemented using software programming or software elements the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but may include software routines in conjunction with processors, and the like.

The particular implementations shown and described herein are illustrative examples of the present disclosure and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the term "the" or a similar definite term in the specification (in particular, in the claims) is to be construed to cover both the singular and the plural. In addition, when a range is disclosed in the embodiments, embodiments to which individual values belonging to the range are applied may be included (unless otherwise indicated herein), and this is the same as that each of the individual values falling within the range is disclosed in the detailed description of the embodiments. For steps of the methods according to the present disclosure, if an order is not clearly disclosed, the steps may be performed in a proper order. The use of all illustrations or illustrative terms (for example, and the like, etc.) in the embodiments is simply to describe the present disclosure in detail, and the scope of the present disclosure is not limited due to the illustrations or illustrative terms unless they are limited by claims. In addition, it will be understood by those of ordinary skill in the art that various modifications, combinations, and changes may be made according to design conditions and factors within the scope of the attached claims or the equivalents.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) apparatus comprising:
    a light source configured to irradiate light onto an object at a plurality of preset irradiation angles;
    a light detector comprising a plurality of light detection elements that are configured to detect light incident from a plurality of different directions, respectively, wherein the light incident from the plurality of different directions is reflected light of the light irradiated onto and reflected from the object;
    a light identifier configured to identify a first light reflected from the object, from among the light incident from the plurality of different directions, based on a preset irradiation angle of an irradiated light and a light detection element, among the plurality of light detection elements, that is preset to detect the first light that is reflected light of light irradiated onto the object at the preset irradiation angle and reflected from the object;
    a processor configured to determine a distance to the object by using the identified first light;
    a plurality of time counters configured to measure a time of flight (TOF) of the light incident from each of the plurality of different directions, a counter among the plurality of time counters being preset to measure a TOF of the first light that is reflected light of light irradiated onto the object at the preset irradiation angle and reflected from the object; and
    a selector configured to identify a TOF of the light reflected from the object, from among the TOFs of the light incident from each of the plurality of different directions, based on the preset irradiation angle of the irradiated light and the counter.

2. The LiDAR apparatus of claim 1, wherein each of the plurality of light detection elements comprises at least one of an avalanche photodiode (APD) and a single photon avalanche diode (SPAD).

3. The LiDAR apparatus of claim 1,
    wherein the processor is further configured to determine the distance to the object based on the TOF of the first light reflected from the object.

4. The LiDAR apparatus of claim 3, wherein each of the plurality of time counters is a time-to-digital converter (TDC), and
    the selector is a multiplexer.

5. The LiDAR apparatus of claim 1, wherein the light identifier comprises:
    a plurality of analog-to-digital converters (ADCs) configured to measure a time of flight (TOF) and an intensity of light incident from each of the plurality of different directions; and
    wherein the processor is further configured to perform data processing for acquiring information about the object based on the TOF and the intensity of the first light reflected from the object.

6. The LiDAR apparatus of claim 1, wherein each of the plurality of light detection elements is further configured to output a current signal, and
    wherein the light detector further comprises:
        a lens configured to collect the light incident from each of the plurality of different directions;
        a plurality of current-to-voltage conversion circuits, each configured to convert the current signal output from one of the plurality of light detection elements into a voltage signal;
        a plurality of amplifiers, each configured to amplify a voltage signal output from one of the plurality of current-to-voltage conversion circuits; and
        a plurality of peak detectors, each configured to detect a peak from the voltage signal amplified by one of the plurality of current-to-voltage conversion circuits.

7. A method of operating a light detection and ranging (LiDAR) apparatus, the method comprising:
    irradiating light onto an object at a plurality of preset irradiation angles;
    detecting light incident from a plurality of different directions by a plurality of light detection elements, respectively, the light incident from the plurality of different directions being reflected light of the light irradiated onto and reflected from the object;
    identifying a first light reflected from the object, from among the light incident from the plurality of different directions, based on a preset irradiation angle of an irradiated light and a light detection element, among the plurality of light detection elements, preset to detect the first light that is reflected light of light irradiated onto the object at the preset irradiation angle and reflected from the object; and
    determining a distance to the object by using the identified first light,
    wherein the identifying the first light reflected from the object further comprises:
        measuring a time of flight (TOF) of the light incident from each of the plurality of different directions by a plurality of time counters;
        presetting a counter among the plurality of time counters to measure a TOF of the first light that is reflected light of light irradiated onto the object at the preset irradiation angle and reflected from the object, and
        identifying a TOF of the first light reflected from the object, from among the TOFs of the light incident from each of the plurality of different directions, based on the preset irradiation angle of the irradiated light and the counter.

8. The method of claim 7, wherein each of the plurality of light detection elements comprises at least one of an avalanche photodiode (APD) and a single photon avalanche diode (SPAD).

9. The method of claim 7,
    wherein the determining comprises determining the distance to the object based on the TOF of the light reflected from the object.

10. The method of claim 9, wherein the measuring the TOF comprises a plurality of time-to-digital converters (TDCs) measuring the TOF of the light incident from each of the plurality of different directions, and the identifying comprises identifying the TOF of the light reflected from the object, from among the TOFs of the light incident from each of the plurality of different directions, by using a multiplexer, based on the preset irradiation angle of the irradiated light.

11. The method of claim 7, wherein the identifying the light reflected from the object comprises:
measuring a time of flight (TOF) and an intensity of the light incident from each of the plurality of different directions using a plurality of analog-to-digital converters (ADCs); and
identifying a TOF and intensity of the light reflected from the object, from among the TOFs and intensities of the light incident from each of the plurality of different directions, by using a multiplexer, based on the preset irradiation angle of the irradiated light, and
the determining comprises performing data processing for acquiring information about the object based on the TOF and the intensity of the light reflected from the object.

12. The method of claim 7, wherein the detecting comprises:
collecting the light incident from each of the plurality of different directions;
individually detecting light incident from each of the plurality of different directions and outputting a respectively corresponding plurality of current signals;
converting the plurality of current signals into a respectively corresponding plurality of voltage signals;
amplifying the plurality of voltage signals; and
detecting a peak from each of the plurality of amplified voltage signals.

13. A non-transitory computer-readable recording medium having recorded thereon a program for performing a method comprising:
irradiating light onto an object at a plurality of preset irradiation angles;
detecting light incident from a plurality of different directions by a plurality of light detection elements, respectively, the light incident from the plurality of different directions being reflected light of the light irradiated onto and reflected from the object;
identifying a first light reflected from the object, from among the light incident from the plurality of different directions, based on a preset irradiation angle of an irradiated light and a light detection element, among the plurality of light detection elements, preset to detect the first light that is reflected light of light irradiated onto the object at the preset irradiation angle and reflected from the object; and
determining a distance to the object by using the identified first light,
wherein the identifying the first light reflected from the object further comprises:
measuring a time of flight (TOF) of the light incident from each of the plurality of different directions by a plurality of time counters;
presetting a counter among the plurality of time counters to measure a TOF of the first light that is reflected light of light irradiated onto the object at the preset irradiation angle and reflected from the object, and
identifying a TOF of the first light reflected from the object, from among the TOFs of the light incident from each of the plurality of different directions, based on the preset irradiation angle of the irradiated light and the counter.

* * * * *